United States Patent [19]
Isobe et al.

[11] Patent Number: 5,003,389
[45] Date of Patent: Mar. 26, 1991

[54] IMAGE SIGNAL PROCESSING APPARATUS FOR Y/C SEPARATION AND FOR TIME DOMAIN/SPATIAL INTERPOLATION OF SUB-NYQUIST SUB-SAMPLING TIME COMPRESSED HIGH DEFINITION TELEVISION SYSTEM

[75] Inventors: Mitsuo Isobe, Osaka; Masanori Hamada, Kadoma; Katsumi Morita, Suita; Yuichi Ninomiya, Kawasaki, all of Japan

[73] Assignees: Matsushita Electric Industrial Co., Ltd., Osaka; Nippon Hoso Kyokai, Tokyo, both of Japan

[21] Appl. No.: 437,688

[22] Filed: Nov. 17, 1989

[30] Foreign Application Priority Data

Nov. 22, 1988 [JP] Japan .................. 63-294927

[51] Int. Cl.⁵ .............. H04N 7/04; H04N 7/01; H04N 11/10; H04N 11/06
[52] U.S. Cl. .................. 358/141; 358/11; 358/12; 358/140; 358/15
[58] Field of Search .............. 358/12, 14, 15, 16, 358/141, 140, 160, 105

[56] References Cited

U.S. PATENT DOCUMENTS

| | | | |
|---|---|---|---|
| 4,704,627 | 11/1987 | Yuyama et al. | 358/88 |
| 4,794,447 | 12/1988 | Tsinberg | 358/141 |
| 4,800,427 | 1/1989 | Plantholt | 358/141 |
| 4,807,056 | 2/1989 | Sasaki et al. | 358/214 |

Primary Examiner—John K. Peng
Attorney, Agent, or Firm—Stevens, Davis, Miller & Mosher

[57] ABSTRACT

An image signal processing apparatus is provided which is applicable to a motion adaptive Y/C separation of an NTSC signal and a time-domain/spatial interpolation of a high definition television signal band-compressed by sub-Nyquist sub-sampling. The apparatus includes a still image processing circuit having frame memories, a motion image processing circuit having a line memory, a mixing circuit for mixing outputs of these processing circuits, a circuit for detecting image motion of an input image signal and applying a resultant control signal to the mixing circuit, and a signal mode control circuit for selectively adapting the image processing circuits for the processing of the NTSC signal or the high definition television signal. The motion detecting circuit includes a narrow band detecting circuit for producing a one-frame interval difference signal of a signal spectrum of a pure low frequency component from the NTSC signal or the high definition television signal respectively, a wide band detecting circuit for a two-frame interval difference signal and a composition circuit for composing outputs of these detecting circuits. The still image processing circuit, motion image processing circuit and mixing circuit are adapted to operate for the Y/C separation with the NTSC signal and for the interpolation of the high definition television signal, respectively.

2 Claims, 2 Drawing Sheets

IMAGE SIGNAL PROCESSING APPARATUS FOR Y/C SEPARATION AND FOR TIME DOMAIN/SPATIAL INTERPOLATION OF SUB-NYQUIST SUB-SAMPLING TIME COMPRESSED HIGH DEFINITION TELEVISION SYSTEM

BACKGROUND OF THE INVENTION

The present invention relates to an image signal processing equipment/apparatus for processing image signals which are different in their baseband signal format, such as a NTSC signal and a MUSE signal.

There has been proposed, as an image signal transmission system, a MUSE system which bandwidth-compressed a high definition television signal having 1125 scanning lines into a signal at about 8.1 MHz by means of multiple sub-Nyquist sampling processing. This transmission system, as disclosed in NHK GIJUTU KENKYU "DEVELOPMENT FOR THE MUSE SYSTEM" Vol. 39, No. 2, 1987, carries out the offset sub-Nyquist sampling between fields, between frames, and lines so that the sub-sampling phase makes a tour for four fields. Basically, a television receiver for high definition television broadcasting is only required to decode the above MUSE signal to restore a high definition television image. This receiver, however, is expected to be able to process the NTSC television broadcasting which is adopted at present. If this can be realized, the receiver becomes inexpensive and also its using value can be increased.

The prior art for this purpose is disclosed in JP-A-62-206977 entitled "High Definition Digital Television Receiver". In the equipment, as shown in FIG. 2, a NTSC signal supplied to a NTSC signal input terminal 1 is supplied to both one terminal of a switch 2 and a NTSC signal processing circuit 3. The NTSC signal is selected by the switch 2 which is connected with the side indicated by a solid line, using a control signal from a control terminal to be sent to a first frame memory 5; this frame memory 5 and a second frame memory 6 which is in a cascade connection with the first frame memory 6 are adapted to be suitable for the NTSC signal processing by the control signal from a conductive line 41. The NTSC signal two frames before is supplied to the NTSC signal processing circuit 3 through a switch 7 to which the output from the second frame memory is supplied and is connected with the side indicated by a solid line, and a conductive line 71. Also, the NTSC signal one frame before is supplied to the NTSC signal processing circuit 3 through a conductive line 51. After having performed a predetermined processing, the NTSC signal processing circuit 3 sends out an image signal based on the NTSC signal to a first signal output terminal 10 as a first output signal.

On the other hand, in the case where a MUSE signal supplied to a MUSE signal input terminal is to be processed, the switches 2 and 7 are connected with the side indicated by a broken line which is opposite to the case mentioned above. Also, the first frame memory 5 and the second frame memory 6 are adapted to be suitable for the MUSE signal processing by the control signal from the conductive line 41. Thus, the MUSE signals are supplied to a MUSE signal processing circuit 9. After having performed a predetermined processing, the MUSE signal processing circuit 9 sends out to a second signal output terminal 80 a high definition television image signal which has been obtained by decoding a bandwidth-compressed signal.

The above prior art, however, has the following disadvantage. In the prior art, only the first and second frame memories 5 and 6 (having a memory capacity of about 4 Mbit, respectively) which are required in principle to process the MUSE signals are also used to process the NTSC signals; the other signal processing circuits are individually provided. Therefore, it is difficult to greatly reduce the production cost of the television receiver having the prior art. In order to realize this, the signal processing circuits are required to be considerably simplified.

SUMMARY OF THE INVENTION

An object of the invention is to provide an image signal processing apparatus which can realize both high quality signal processing and low production cost by processing MUSE signals and NTSC signals by a substantially common signal processing circuit.

In accordance with one aspect of the present invention, there is provided an image signal processing apparatus comprising a frame delay means, movement detection device for detecting image movement in one frame or two frames interval using frame correlation of image signals of plural frames at different times and using different detection signal bands, moving picture processing means for providing a first image signal for a moving picture part of a field of the image in issue, still (stationary) image processing means for providing a second image signal for a still image part using the image signals of plural frames, mixing means for mixing said first and second image signals using an output from said movement detection means as a control signal, and mode control means for controlling said movement detection means, said moving picture processing means and said still image processing means so that they perform predetermined processings in accordance with the NTSC signal and the MUSE signal.

The frame delay means delays an input image signal to produce two kinds of image signals one frame or two frames before the field in issue. The movement detection means supplied with these image signals is composed of a one frame interval movement detection circuit for producing a first movement signal based on a one frame interval difference signal, a two frame interval movement detection circuit for producing a second movement signal based on a two frame interval difference signal and composition circuit for comprising the first and second movement signals into a composite movement signal which is supplied to the mixing means as a control signal. The mode control means controls the one frame interval movement detection circuit and the two frame interval movement detection circuit for both modes of the NTSC signal and the MUSE signal so that the former performs narrow bandwidth signal processing so as to operate for only the low frequency signal component free from a so-called aliasing signal component due to compression of a sub-Nyquist sampling band and a frequency-multiplexed signal component, and the latter performs a wide band signal processing not so as to substantially limit the signal band. The moving picture processing means performs a spatial filter processing for an input signal of the field in issue to produce the first image signal. The still image processing means, using the image signals of the field in issue and one frame before it, performs inter-frame interpolation processing for the MUSE signal, and performs inter-frame arithmetic operation for the NTSC signal to remove a carrier chrominance signal component from the frequency-multiplexed signal component, thereby to produce the second image signal.

DESCRIPTION OF THE PREFERRED EMBODIMENTS

Embodiments of the present invention will be explained with reference to FIG. 1.

Figure 1:
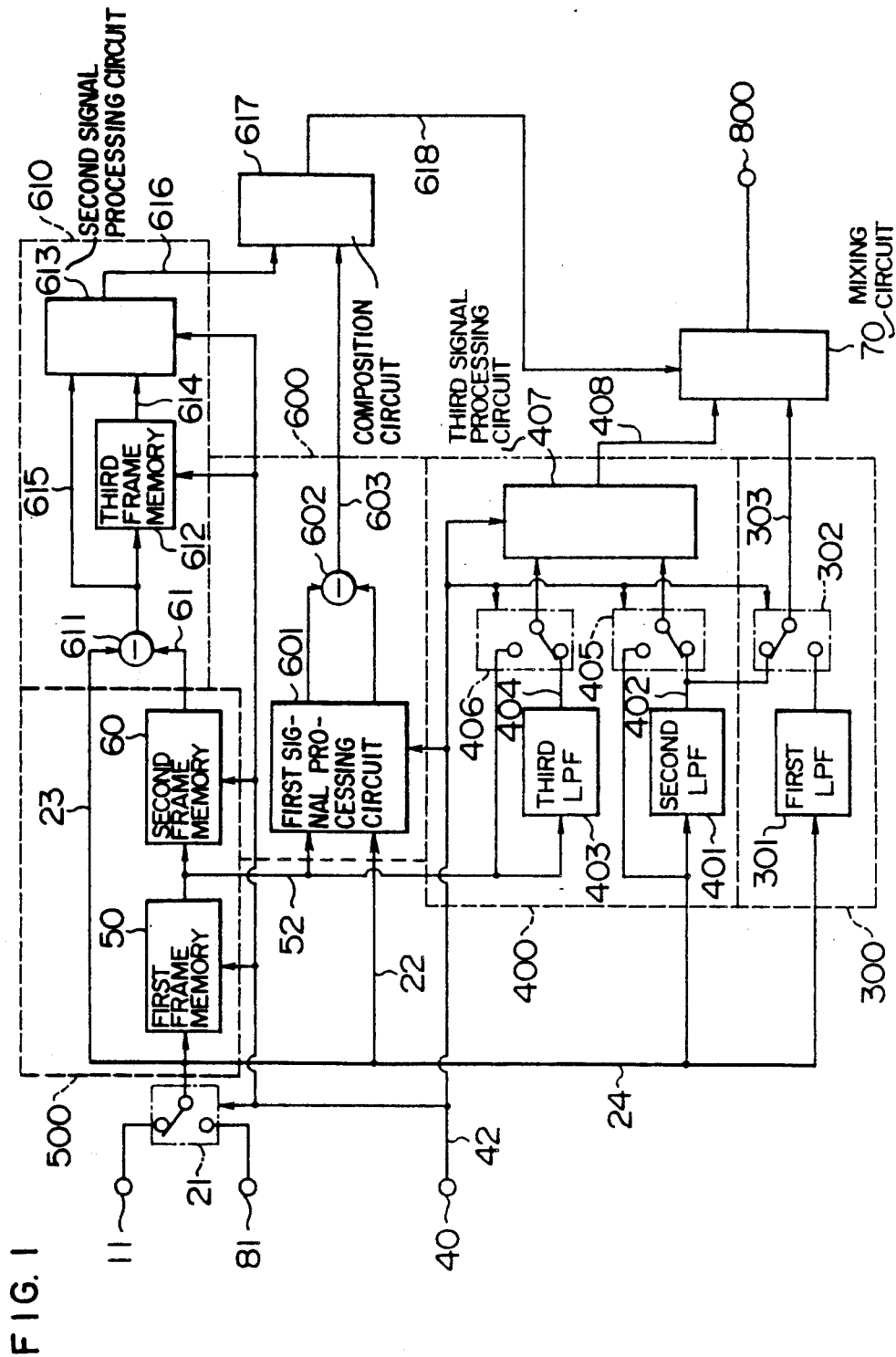
FIG. 1 is a block diagram of an image signal processing apparatus according to one embodiment of the present invention.
Figure 2:
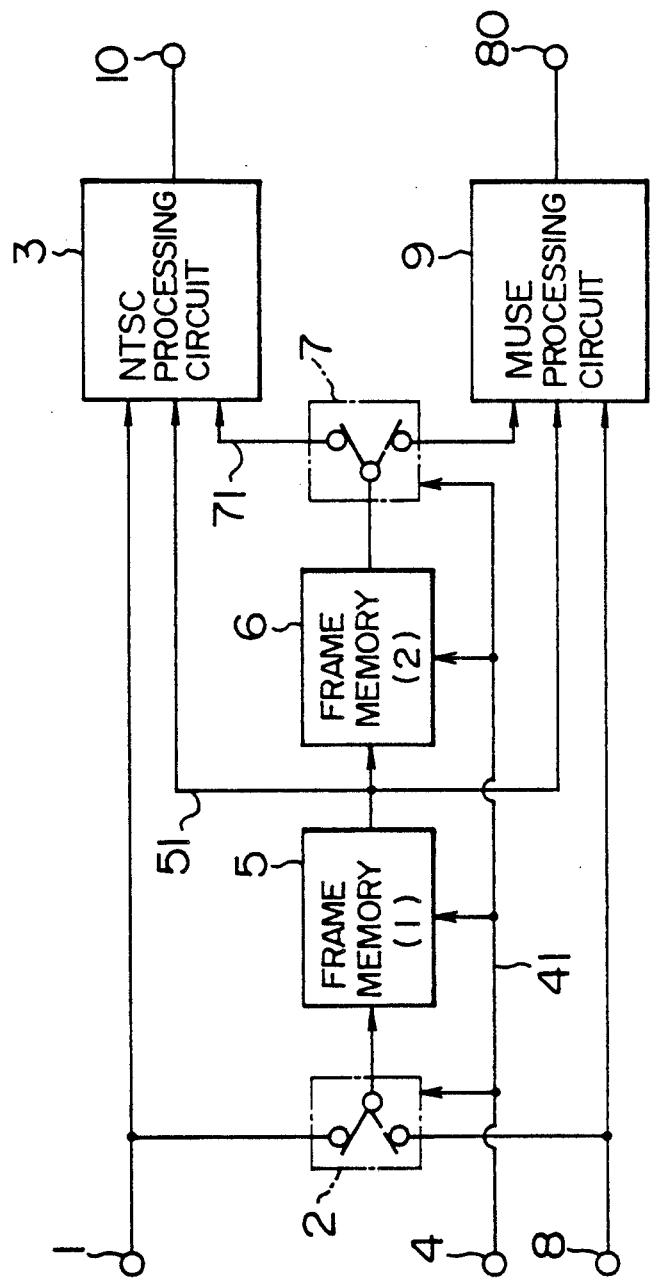
FIG. 2 is a block diagram of an image signal processing apparatus according to the prior art.

FIG. 1 is a block diagram of an image signal processing apparatus according to an embodiment of the present invention. One of a NTSC signal and a MUSE signal supplied to signal input terminals 11 and 81, respectively, is selected by a switch 21. A frame delay circuit 500 is composed of a first frame memory 50 and a second frame memory 60. These first and second frame memories 50 and 60 are controlled, for any signal supplied through the switch 21, by a mode control signal sent through a conductive line 42 from a terminal 40 so that they hold one frame, respectively. Now, it is assumed that where the NTSC signal from the terminal 11 has been selected by the switch 21 under the control of a control signal supplied from a terminal 40. In this case, all the image signal components with the carrier chrominance signal frequency multiplexed are subjected to one frame delay processing to send out the NTSC signals one frame before and two frames before to a conductive line 52 and a conductive line 61, respectively.

In a one frame interval movement detection circuit 600 to which the one-frame-before signal and an input signal are supplied from the conductive line 52 and a conductive line 22, a first signal processing circuit 601 extracts from the respective signals the low frequency hand components not including the carrier chrominance signals (e.g. luminance signals at up to about 2 MHz), and a subtracter 602 acquires a one frame interval difference signal component between the respective signals; this difference signal component is subjected to an absolute value processing and thereafter is sent to a conductive line 603 directly or through a desired signal processing as required as a one frame interval movement detection signal based on the one frame interval difference signal component.

In a two frame interval movement detection circuit 610 to which the input signal and the two-frame-before NTSC signal are supplied through a conductive line 23 and a conductive line 61, a subtracter 611 makes direct subtraction for all the image signal components of the NTSC signal which are relatively different by two frames since all the signal components are in phase for a still image; the two frame interval difference signal component thus obtained is subjected to the absolute value processing, and thereafter is sent to a third frame memory 612 and a second signal processing 613 directly or a desired signal processing as required. The second signal processing circuit 613 to which an output signal from the third frame memory 612 and an output signal from the subtracter 611 are supplied through a conductive line 614 and a conductive line 615, respectively, in response to the mode control signal supplied through the conductive line 42, sends out a larger one of the above output signals or an average value thereof to a conductive line 616 as a two frame interval movement detection signal based on two frame interval difference signal.

A composition circuit 617 to which the one frame interval movement detection signal and the two frame interval movement detection signal are supplied through the condition lines 603 and 616 selects larger one of them or takes an average value thereof to send it to a conductive line 618 as a composite movement signal.

A moving picture processing circuit 300 is composed of a first low-pass filter circuit (LPF) to which the NTSC signal is supplied as an input signal through the conductive line 24 and a switch 302. This moving picture processing circuit 300 is controlled by the mode selection signal supplied through the conductive line 42 so that an output signal from a second low-pass filter (LPF) 401 of a still image processing circuit 400 is selected by the switch 302 and sent to tone input of a mixing circuit 70 through a conductive line 303.

The second LPF 401 extracts the luminance signal component from the NTSC signal on the field in issue by the two dimensional spatial filter processing using the correlation between the image signals in a horizontal and vertical directions to send out to a conductive line 402 as the luminance signal for the moving picture. Therefore, the luminance signal subjected to the processing within the field in issue is supplied to the conductive line 303 of the moving picture processing circuit 300. A third LPF 403 to which the one-frame-before NTSC signal is supplied through the conductive line 52 sends out a one-frame-before luminance signal to a conductive line 404 in the same manner as in the second LPF. Like the switch 302, switches 405 and 406, in accordance with the mode control signal from the conductive line 42, serve to select the outputs from the second and third LPF's to supply the in-issue field signal and the one-frame-before signal, which are relatively different by one frame, to a third signal processing circuit 407.

The third signal processing circuit 407 is controlled by the above mode control signal to carry out the addition of the NTSC signals and removes through the frame correlation processing the carrier chrominance signal component for the still image from the input signal with the carrier chrominance signal remaining in the image component with less correlation in the horizontal or vertical direction so as to send out the luminance signal for the still image to a conductive line.

Thus, the mixing circuit 70 is supplied with the luminance signals for the moving picture and the still image through the conductive lines 303 and 408, respectively. Using the composite movement signal from the conductive line 618 as a control signal, the mixing circuit 70 mixes these luminance signals as a predetermined ratio and also selects the luminance signal on the side of the conductive line 408 or 303 for the complete still image part or moving picture part. The luminance signal thus obtained is sent to a signal output terminal.

Explanation will be given for the case where a control signal for processing a MUSE signal is supplied to the terminal 40. In this case, the switches 21, 302, 405 and 406 are controlled by the mode control signal so as to provide the signal selection state opposite to the case of selecting the NTSC signal as illustrated in FIG. 1. Thus, the first to third frame memories 50, 60 and 612 perform one frame delay processing for the MUSE signal; the frame memories 50 and 60, therefore, send out the one-frame before MUSE signal and the two-frame-before MUSE signal to the conductive lines 52 and 61, respectively.

The first signal processing circuit 601 is controlled by the mode control signal so that it extracts, for the in-issue field signal and the one-frame-before signal, the low frequency signal component at up to about 4 MHz free from the aliasing signal component generated owing to the sub-Nyquist sampling processing. The subtracter 602 produces a one frame interval difference signal, and the one frame interval detection signal based on it is sent to the conductive line 603.

In the two frame interval movement detection circuit 610 to which the in-issue field MUSE signal and the two-frame-before MUSE signal are supplied through the conductive lines 23 and 61, respectively, the second signal processing circuit 613 is controlled by the mode control signal to carry out inter-frame interpolation, and sends out a two frame interval movement detection signal based on the two frame interval difference signal to the conductive line 616. The composition circuit 617, as in the case of processing the NTSC signal, selects a larger one of the frame interval movement detection signal and the two frame interval movement detection signal or takes an average value thereof to send it to a conductive line 618 as a composite movement signal.

In the moving picture processing circuit 300, the MUSE signal on the in-issue field supplied through the conductive line 24 is subjected to the two-dimensional spatial filter processing in the first LPF and the signal thus formed is supplied to the mixing circuit 70 as a signal for the moving picture part through the switch 302 and the conductive line 303. In the still image processing circuit 400, the in-issue field MUSE signal and the one-frame-before MUSE signal supplied through the conductive lines 24 and 52, respectively are sent to the third signal processing circuit 407 through the switches 405 and 406. The third signal processing circuit 407, after having performed the inter-frame interpolation processing and the other desired signal processing by the mode control signal, supplies the signal thus formed to the mixing circuit 70 as a signal for the still image part through the conductive line 408. The mixing circuit 70, as in the case of processing the NTSC signal, mixes the above two kinds of input signals using the above composite signal as a control signal, and sends out the signal thus formed to the output terminal 800 as a high definition television signal restored from the MUSE signal which is a bandwidth-compressed signal.

In actually embodying the present invention, it is convenient to use known digital processing circuits. In this case, the mode control signal carries out the above controls described above and serves to change the clock signal or the operation condition of predetermined counters in accordance with the NTSC signal and the MUSE signal. Therefore, the increase of scale of the equipment can be remarkably suppressed. In accordance with the present invention, using the movement signal detected for the moving part of input image signals which different in their signal format, optimum signal processing for both a still image part and a moving picture part can be made in substantially the same circuit.

We claim:

1. An image signal processing device for processing a MUSE signal and a NTSC signal, comprising:
   frame delay means;
   movement detection means for detecting the movement of an image on the basis of the difference signals in one frame interval and two frame interval of image signals which are supplied from said frame delay means and relatively different in their time;
   moving picture processing means for providing a first image signal for a moving picture part of a field of the image in issue;
   still image processing means for providing a second image signal for a still image part using the image signals of plural frames;
   mixing means for mixing said first and second image signals from said moving picture processing means and still image processing means using an output from said movement detection means as a control signal;
   said movement detection means comprising a one frame interval movement detection circuit, a two frame interval movement detection circuit and a composition circuit for composing outputs from said movement detection circuits,
   wherein said one frame interval movement detection circuit is adapted to use a low frequency signal component which does not include a frequency-multiplexed chrominance signal component or a signal aliasing component in each processing of the MUSE signal and the NTSC signal, and said two frame interval movement detection circuit comprises a frame memory for providing frame delay to a movement signal based on a two frame interval difference signal so as to produce an inter-frame interpolated signal for the MUSE signal and prepare a composite signal of an input to and an output from the frame memory for the NTSC signal.

2. An image signal processing apparatus according to claim 1, wherein said one frame interval movement detection circuit serves to extract a low frequency band signal component at up to about 4 MHz for the MUSE signal and up to 2 MHz for NTSC signal.

* * * * *